3,657,356
STABILIZED ETHER COMPOSITIONS
Patricia Lucille Hudgins, South Charleston, W. Va., George Raymond Stringer, Somerville, N.J., and William Herald Swango, St. Albans, W. Va., assignors to Union Carbide Corporation, New York, N.Y.
No Drawing. Filed Jan. 21, 1969, Ser. No. 792,850
Int. Cl. C07c 41/04
U.S. Cl. 260—611.5
8 Claims

ABSTRACT OF THE DISCLOSURE

Organic mono and poly ethers are inhibited against peroxide formation by the addition thereto of trace amounts of a tetraalkyl thiuram disulfide. Illustrative ethers are diethyl ether, the monoethyl ethers of ethylene glycol or triethylene glycol, methoxyethyl acetate, dioxane, 1,3-dioxolane, di(butoxyethyl) phthalate, useful inhibitors are tetramethyl thiuram disulfide, tetradecyl thiuram disulfide, dimethyl dibutyl thiuram disulfide. The ethers are known compounds having established uses.

---

This invention relates to the inhibition of peroxide formation in organic ethers by the addition thereto of a tetraalkyl thiuram disulfide and to the composition obtained thereby.

Organic compounds containing the etheric oxygen linkage are known to undergo peroxide formation during storage. This propensity for peroxide formation is further aggravated by exposure to light and atmospheric oxygen; consequently, the dialkyl ethers are generally stored in airtight metal cans. The preservation of diethyl ether has previously been accomplished by the addition thereto of certain dithiocarbamates, as disclosed in U.S. 2,818,438.

It has now been found that certain tetraalkyl thiuram disulfides inhibit the formation of peroxides in certain organic compounds containing the etheric oxygen linkage.

The tetraalkyl thiuram disulfides useful in this invention have the general formula

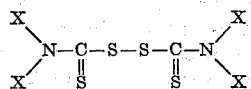

wherein X is an alkyl group containing from 1 to about 10 carbon atoms. Illustrative thereof one can mention tetramethyl thiuram disulfide, tetraethyl thiuram disulfide, tetrapropyl thiuram disulfide, tetrabutyl thiuram disulfide, tetraamyl thiuram disulfide, tetraoctyl thiuram disulfide, tetradecyl thiuram disulfide, dimethyl diethyl thiuram disulfide, dimethyl dibutyl thiuram disulfide, dimethyl didecyl thiuram disulfide, dibutyl diamyl thiuram disulfide and the like.

The concentration of the inhibitor can be any amount sufficient to inhibit peroxide formation in the etheric compound. The amount can vary from about 0.03 p.p.m. to about 100 p.p.m., or more, based on the etheric compound. Up to one percent by weight, or more, can be added if desired, limited only by its solubility in the ether. The preferred concentration is from about 0.05 p.p.m. to about 10 p.p.m. The preferred particular concentration to be used in a particular instance will vary depending upon the specific etheric compound and the specific tetraalkyl thiuram disulfide inhibitor being used. The inhibitor can be added to the etheric compound by any conventional process.

The etheric compounds that can be stabilized are the aliphatic mono and poly ethers, substituted and unsubstituted, and the cyclic ethers. These ethers are represented by the general formulae:

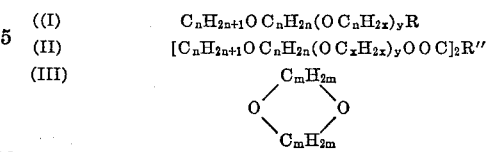

wherein $m$ has a value of 1 or 2; $n$ has a value of 1 to about 6; $x$ has a value of 2 to about 4; $y$ has a value of 0 to about 10; R can be hydrogen, hydroxyl or —OOCR' wherein R' is alkyl of from 1 to about 10 carbon atoms or aryl of from 6 to about 12 carbon atoms; and R'' is divalent alkylene of 1 to about 10 carbon atoms or divalent arylene of from 6 to about 12 carbon atoms. Illustrative thereof one can mention diethyl ether, the dipropyl ethers, methyl n-butyl ether, ethyl n-butyl ether, di-n-butyl ether, di-n-amyl ether, diisoamyl ether, dihexyl ether, monomethyl ether of ethylene glycol or of propylene glycol or of butylene glycol or of diethylene glycol or of triethylene glycol or of dipropylene glycol or of octaethylene glycol or the monoethyl ethers or the monobutyl ethers or the monopentyl ethers or the monohexyl ethers of said glycols, methoxyethyl acetate, ethoxyethyl acetate, methoxyethyl butyrate, ethoxyethyl hexoate, ethoxyethyl decanoate, methoxyethyl benzoate, ethoxyethyl naphthoate, ethoxy diethyleneglycol acetate, methoxytetraethyleneglycol propionate, ethoxydiethyleneglycol benzoate, ethoxytriethyleneglycol benzoate, di(butoxyethyl) phthalate, di(methoxybutyl) phthalate, di(butoxyethyl)-malonate, di(ethoxyethyl) oxalate, di(propoxyethyl) pimelate, di(methoxyethyl) sebacate, di(ethoxydiethyleneglycol) succinate, di(butoxydiethyleneglycol) phthalate, and the like.

The inhibitor can be added to the ether by mixing it into the ether by any conventional mixing procedure.

The inhibition effect of the inhibitor was determined by storing the organic ether in an amber glass container at room temperature and exposing the container to daylight. At periodic times, the contents were analyzed for peroxide.

Two analytical procedures were used to analyze for peroxide content in the ethers. Procedure A was used in Examples 1 to 6 and 16 and Procedure B was used in Examples 7 to 15 and 17.

Procedure A.—This procedure for measuring peroxides in low concentrations in organic ethers utilizes the reaction of the contained peroxides in 150 grams of the ether with ammonium meta vanadate reagent. An aqueous layer containing the reaction product is separated and its absorbance measured at a wavelength of 460 millimicrons on a Beckman Model B Spectrophotometer, The peroxide content as p.p.m. hydrogen peroxide is read from a previously prepared calibration curve. The ammonium meta vanadate reagent is prepared by transfer of 1 gram of reagent grade ammonium met vanadate ($NH_4VO_3$) to a 250 milliliter Erlenmeyer flask containing 100 milliliters of 10 weight percent sulfuric acid. Mix until solution is complete.

Procedure B.—This procedure involves the reaction of peroxides in the ether with sodium or potassium iodides to release iodine quantitatively from an acidified solution. This iodine is then measured by titrating with standardized 0.01 normal solution of sodium thiosulfate. Conditions and techniques used in applying this procedure are those generally known and accepted in the chemical industry.

The following examples further serve to illustrate the invention.

EXAMPLE 1

To 2,135 ml. of diethyl ether there was added 0.2041 gram, 135 parts per million, of tetramethyl thiuram disulfide. This solution, along with another portion of the same ether, was stored at room temperature in daylight, under air, in an amber bottle. In addition, solutions were prepared using known conventional stabilizers at the same concentration. At selected times, samples were analyzed for peroxide content, calculated as hydrogen peroxide. The inhibitor of this invention was exceedingly superior. The results are tabulated below:

| Stabilizer | Peroxide content, p.p.m. | | | | | |
|---|---|---|---|---|---|---|
| | A | B | C | D | E | Control |
| Storage time, days: | | | | | | |
| 0 | 0.45 | 0.65 | 0.87 | 0.92 | 0.87 | 0.62 |
| 4 | 0.47 | 1.0 | 4.1 | 3.5 | 4.0 | 1.1 |
| 7 | 0.43 | 1.4 | 7.7 | 5.6 | 6.0 | 1.4 |
| 17 | 0.43 | 3.7 | | | | 5.9 |
| 24 | 0.51 | 4.6 | | | | 9.0 |
| 48 | 0.53 | 11 | | | | 25 |

A—Tetramethyl thiuram disulfide.
B—Naphthyl-N-methylcarbamate.
C—Zinc dimethyldithiocarbamate.
D—Diphenyldecyl phosphite.
E—Sodium borohydride.

The use of tetrabutyl thiuram disulfide or tetradecyl thiuram disulfide gives stabilizing results similar to those obtained with the tetramethyl thiuram disulfide.

EXAMPLE 2

Diethyl ether was stabilized using 0.0104 gram of tetramethyl thiuram disulfide in 2,920 ml. of the ether, 5 parts per million. A control and solutions containing conventional stabilizers were also prepared. The results are tabulated below:

| Stabilizer | Peroxide content, p.p.m. | | | | | | |
|---|---|---|---|---|---|---|---|
| | A | B | C | D | E | F | Control |
| Storage time, days: | | | | | | | |
| 0 | 0.68 | 0.65 | 0.70 | 0.78 | 0.80 | 0.41 | 0.70 |
| 5 | 0.75 | 0.87 | 0.92 | 3.0 | 4.9 | | 3.8 |
| 13 | 0.69 | 1.0 | 1.6 | 4.3 | 12 | | 12 |
| 20 | 0.67 | 1.2 | 3.5 | | | | 21 |
| 24 | | | | | | 21 | |
| 37 | 0.75 | 3.4 | 7.4 | | | | 27 |
| 50 | | | | | | 27 | |
| 98 | | | | | | 33 | |
| 139 | 1.1 | 33 | | | | | 35 |

A to E—See Example 1, footnotes to table.
F—Potassium permanganate.

In Examples 3 to 6, tabulated below, diethyl ether was stabilized with tetramethyl thiuram disulfide as the inhibitor. In Examples 5 and 6, it was shown that the presence of iron rust and stainless steel did not destroy the effectiveness of the inhibitors of the instant invention. The presence of iron rust in ethers is known to promote peroxide formation.

| Example | 3 | | 4 | | 5 | | 6 | |
|---|---|---|---|---|---|---|---|---|
| Stabilizer, p.p.m. | 0.44 | 0 | 0.03 | 0 | 0.4 | [1]0.4 | 0 | [2]0.4 | 0 |
| Storage time, days: | | | | | | | | |
| 0 | 0.47 | 0.52 | 0.43 | 0.52 | 0.26 | 0.26 | 0.26 | 0.4 | 0.4 |
| 21 | | | | | 0.52 | 0.31 | 20 | | |
| 98 | | | 5.7 | 33 | | | | | |
| 120 | 0.29 | 33 | | | | | | | |
| 183 | | | | | | | | 1.46 | 4,900 |

[1] Also contained 1,100 p.p.m. of iron rust and a stainless steel coupon.
[2] Also contained 150 p.p.m. of iron rust and a stainless steel coupon.

EXAMPLE 7

To 3785 milliliters of refined 1,3-dioxolane there was added 0.041 grams of tetramethyl thiuram disulfide, 10.15 parts per million. This sample and a control sample without inhibitor were stored under the conditions described in Example 1. After 203 days the control sample increased in peroxides from 4.8 p.p.m. to 1045 p.p.m. while the sample containing the tetramethyl thiuram disulfide inhibitor showed an increase to only 12 p.p.m. The peroxide was calculated as hydrogen peroxide.

EXAMPLE 8

To 1858 grams of refined dibutyl ether there was added 0.0196 gram of tetramethyl thiuram disulfide, 10.5 parts per million. This material was stored along with an uninhibited sample under the physical conditions described in Example 1. After 189 days, the peroxide content of the control sample had increased from 5.3 p.p.m. to 412 p.p.m. while the sample containing the tetramethyl thiuram disulfide inhibitor increased from 5.3 to only 11 p.p.m. The peroxide was calculated as dibutyl peroxide.

EXAMPLE 9

Example 8 was repeated using 5.3 p.p.m. of the tetramethyl thiuram disulfide inhibitor. After 189 days the peroxide content of the control sample increased from 5.3 p.p.m. to 412 p.p.m. while the inhibited sample decreased from 5.3 to 3.0 p.p.m. The peroxide was calculated as dibutyl peroxide.

EXAMPLE 10

To 2,685 millilit ers of refined monobutyl ether of ethylene glycol there was added 0.0246 grams of the tetramethyl thiuram disulfide inhibitor. This sample and a control sample without inhibitor were stored under the conditions described in Example 1. After 62 days, the peroxide content increased in the control sample from 1.4 p.p.m. to 91 p.p.m. while the inhibited sample showed an increase from 1.4 p.p.m. to only 7.8 p.p.m. The peroxide values were calculated as hydrogen peroxide.

The use of tetraamyl thiuram disulfide gives similar results.

EXAMPLE 11

Example 10 was repeated using 0.0133 gram of tetramethyl thiuram disulfide as inhibitor, 5 parts per million, in 2,685 ml. of monobutyl ether of ethylene glycol. After 196 days, the control increased in peroxide content from 1.4 p.p.m. to 1313 p.p.m. while the inhibited sample showed an increase to only 2 p.p.m. The peroxide values were calculated as hydrogen peroxide.

EXAMPLE 12

To 2,225 milliliters of refined dioxane there was added 0.0231 gram of tetramethyl thiuram disulfide as inhibitor. This sample and a uninhibted control sample of the same dioxane was stored under the same conditions specified in Example 1. After 196 days the control sample had increased in peroxide content from 2.5 p.p.m. to 403 p.p.m. while the inhibited sample showed an increase to only 7.6 p.p.m. The peroxide was calculated as hydrogen peroxide.

EXAMPLE 13

To 1979 grams of refined ethoxyethyl acetate there was added 0.0218 gram of tetramethyl thiuram disulfide as inhibitor, 10 parts per million. This sample and an uninhibited control of the same acetate was stored under the conditions specified in Example 1. After 183 days, the control sample had increased in peroxide content from 5.3 p.p.m. to 953 p.p.m. while the sample containing the inhibitor decreased to 2.6 p.p.m.

EXAMPLE 14

To 3115 grams of refined di-(butoxyethyl) phthalate there was added 0.306 gram of tetramethyl thiuram disulfide as inhibitor, 10 parts per million. The sample was stored with an uninhibited control from the same product batch under the condition specified in Example 1. After 32 days, the peroxide content of the control had increased from 2.4 p.p.m. to 152 p.p.m. while the inhibited sample increased to only 7.6 p.p.m. After 81 days, the peroxide contents were 496 and 58 p.p.m., respectively. The peroxide values were calculated as hydrogen peroxide.

The use of dimethyl dipropyl thiuram disulfide or tetrahexyl thiuram disulfide gives similar inhibiting results.

EXAMPLE 15

To 2611 grams of refined ethoxytriglycol benzoate there was added 0.024 gram of tetramethyl thiuram disulfide as inhibitor, 10 parts per million. This sample was stored with an uninhibited control from the same batch under the conditions specified in Example 1. After 61 days, the peroxide level of the control had risen from 3.7 p.p.m. to 763 p.p.m. while the sample containing the inhibitor increased to only 34 p.p.m. The peroxide values were calculated as hydrogen peroxide.

EXAMPLE 16

To 602 grams of refined isopropyl ether there was added 0.0059 gram of tetramethyl thiuram disulfide as inhibitor, 10 parts per million. This sample was stored with a control sample from the same product batch under the same conditions described in Example 1. After 30 days the control had increased peroxide from 0.8 p.p.m. to 1,500 p.p.m. and was discarded. The inhibited sample contained only 29 p.p.m. after 62 days storage. The peroxide values were calculated as hydrogen peroxide.

EXAMPLE 17

To 3,375 grams of refined monoethyl ether of ethylene glycol there was added 0.0334 gram of tetramethyl thiuram disulfide inhibitor, 10 parts per million. This sample was stored with a control sample from the same product batch under the conditions specified in Example 1. After 60 days the control sample had increased in peroxide content from 3.3 p.p.m. to 404 p.p.m. While the sample containing the inhibitor increased to only 39 p.p.m. The peroxide values were calculated as hydrogen peroxide.

The use of dibutyl diamylthiuram disulfide as inhibitor gives similar results.

What is claimed is:

1. A composition of an organic ether of the formula:

$$C_nH_{2n+1}OC_nH_{2n}(OC_xH_{2x})_yR$$

wherein $n$ has a value of 1 to 6; $x$ has a value of 2 to 4; $y$ has a value of 0 to 10; and R can be hydrogen or hydroxyl and an inhibiting amount sufficient to inhibit peroxide formation of a tetraalkyl thiuram disulfide containing from 1 to 10 carbon atoms per alkyl group.

2. A composition as claimed in claim 1 wherein the tetraalkyl thiuram disulfide is tetramethyl thiuram disulfide.

3. A composition as claimed in claim 1 wherein the tetraalkyl thiuram disulfide is tetrabutyl thiuram disulfide.

4. A composition as claimed in claim 1 wherein the organic ether is diethyl ether.

5. A composition as claimed in claim 1 wherein the organic ether is dibutyl ether.

6. A composition as claimed in claim 1 wherein the organic ether is the monobutyl ether of ethylene glycol.

7. A composition as claimed in claim 1 wherein the organic ether is isopropyl ether.

8. A composition as claimed in claim 1 wherein the organic ether is the monoethyl ether of ethylene glycol.

References Cited

UNITED STATES PATENTS 3,244,627   4/1966   Smith et al. _____ 260—611.5
3,245,923   4/1966   Manzella et al. ____ 260—611.5

OTHER REFERENCES

"Chemical Abstracts," vol. 67, 1967, col. 34670s (Abstracts of Netherland Patent No. 6610359, 1/24/67).

ALEX MAZEL, Primary Examiner

J. H. TURNIPSEED, Assistant Examiner

U.S. Cl. X.R.

260—48, 338, 340.6 340.7, 340.9 414, 469, 475, 476, 488, 567